INVENTOR.
Henry A. Giesecke 3,433,556
INSERTABLE DIAPHRAGM RINGS FOR OPTICAL, CONVERGING LENS SYSTEMS TO REDUCE DIFFRACTION VIGNETTING
Henry A. Giesecke, Valley Stream, N.Y., assignor to Apromat, Inc., Barrington, Ill., a corporation of Delaware
Filed Mar. 23, 1965, Ser. No. 442,114
U.S. Cl. 350—162                  11 Claims
Int. Cl. G02b 5/00, 7/00

ABSTRACT OF THE DISCLOSURE

In an image-forming optical system, vignetting edge means carried by a transparent toroidal member which illuminates the edge means with the green-blue-violet range of the spectrum so as to eliminate longer wave lengths and thereby improve the contrast-resolution.

---

Figure 1:
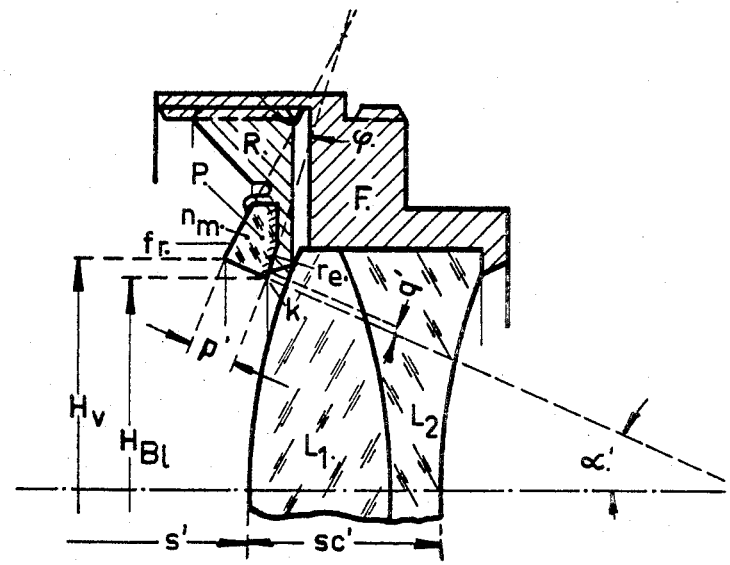

In image-forming lens systems two natural phenomena limit the desirable increase of the point-focal vision of the image, which is also denoted contrast-resolution.

First, the phenomenon of the diffraction vignetting occurs and further spherical limiting surfaces are used on single lenses, the individual aberrations of which can be limited in systems, but are rather difficult to eliminate completely.

The present invention is concerned with the phenomenon of diffraction vignetting only.

By mirror and reflection rules and the principle of Malus the course of a light ray in optical media can be construed. If thereby the so-called geometrical optics assumes that two points along a path of light are to be considered as the starting and end point of a straight line, this is not completely correct according to the light-wave theory. Therefore, "light rays" have a fictive meaning. They are mathematical auxiliary constructions on orthogonal trajectories, on which concentric wave surface advance is denoted a straight-line "light-ray."

If, however, the wave surface advance is referred to spherical trajectories, the "light ray" has a course on curved, i.e. bent paths. If this is optically not recognizable, the physical optics permit this explanation only.

In the refinement of image-forming systems which according to the geometric-optical concept endeavor to perfectly unite the object point and the picture point, it is essential to know, where and at what time a crest and a wave trough are located and what phases of diplacement occur between the waves.

Diffraction vignetting occurs at all rims of lenses and contractions of systems which limit the light wave surfaces. Such "wounded rims" resist every punctiform union and produce blurred image limits in detail, i.e. the spherical wave fronts get loose at the smallest particles of the border (diaphragm), they act diverging within the light wave dimension, interfere in their wave train and thereby produce uncontrollable reflection of light, which simulates self-illumination. The brightly illuminated, very small particles of smoke and dust particles are made visible by this diffraction vignetting.

Rayleigh's principle: In the optics of waves every laterally limited "ray" is indefinite (Phil. Mag. (4), 8,261 (1879) Scientif. Pap., 1, p. 145) still represents in this field up to date the state of the art.

Spherical waves produced by every good lens systems form no point of light perpendicularly to the axis of the system but a "diffraction disk" which is enclosed by few bright rings (aureole).

The diameter of this central diffracting disk in the image space is:

$$\delta' = \frac{1.22\lambda}{n' \sin \alpha'}$$

wherein $\lambda=$is the light wave length, $n'$ is the refractive number in the image space, $\alpha'$ the aperture angle of the lens system; the factor 1.22 results strictly in accordance with Fresnel's first elementary zone equation for parallel incidence of light of circular limitation of spherical wave of unchanged shape.

It will be understood from the above equation that smaller wave lengths and larger aperture angles and refractive numbers reduce the size of the diffraction disk, i.e. they detail the point-focal image, increase the contrast, and the resolving power.

At ideal unification of rays the strongest concentration of light is in the center of the diffraction setting. 97.5% of the light energy is located within and only 2.5% outside the rings. This characteristic and the decentralized shaping of the diffraction vignetting is used as a test for the quality of lens systems, as criterion.

While Abbe has attained successes by his light-microscope optimum conditions by high aperture angles and refractive numbers (immersions) and Siedentopf/Zsigmondy have increased by ultralight of shortest wave length the limit of resolution in microscopes, in telescopy and photography of optical instruments no analogous development has taken place in order to eliminate diffraction vignetting.

Figure 2:
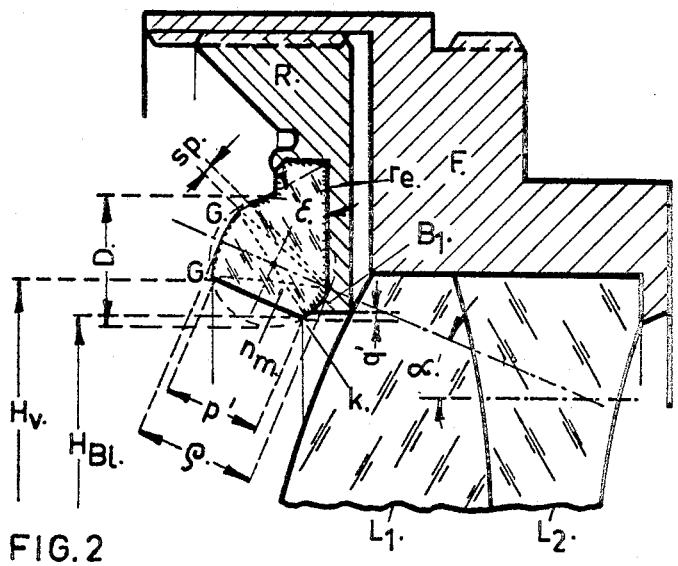
Figure 3:
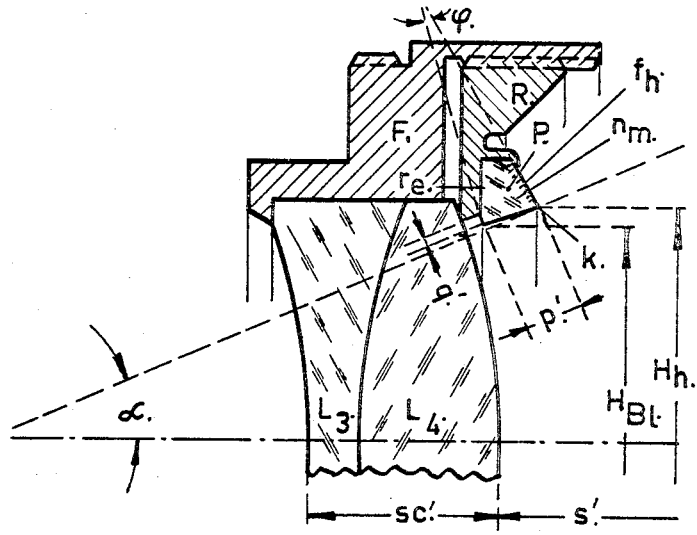
Figure 4:
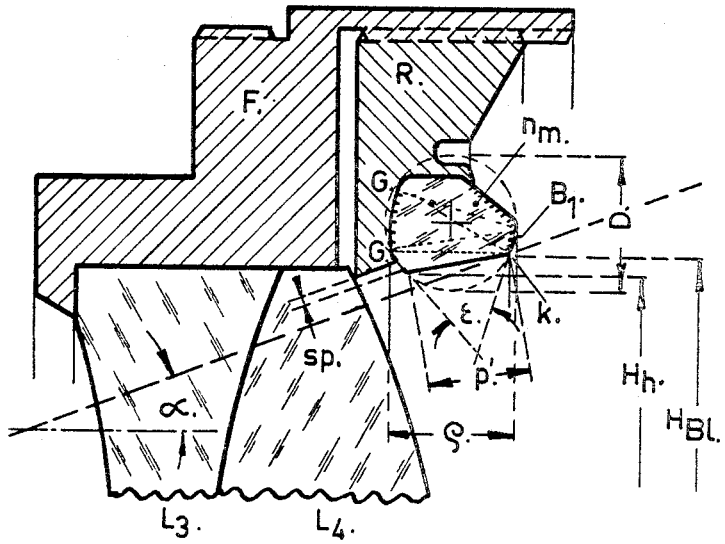
Figure 5:
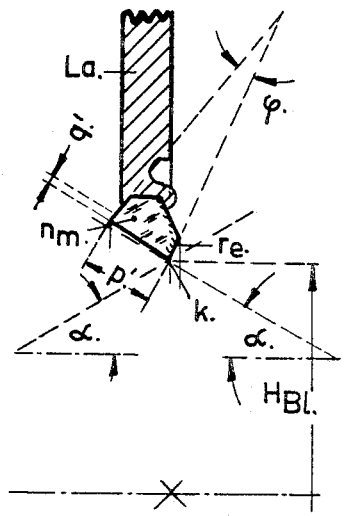
Figure 6:
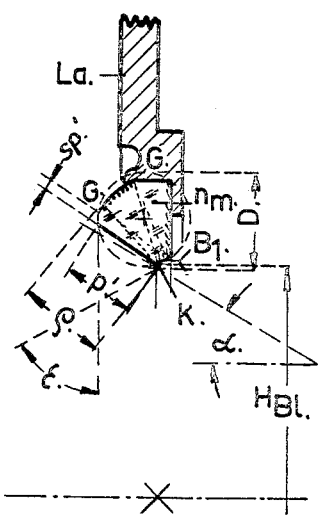
Figure 7:
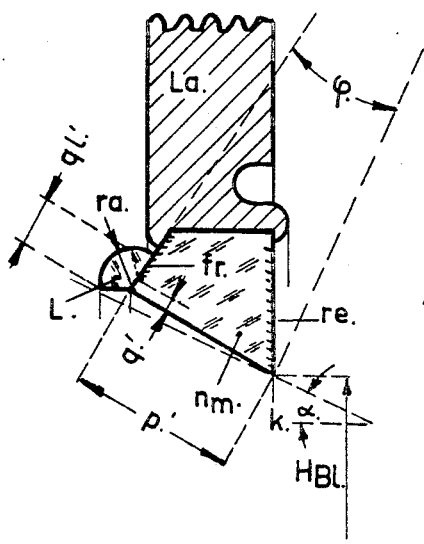
Figure 8:
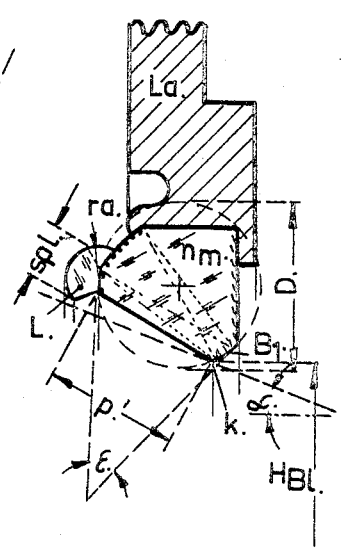

The appended drawings illustrate by way of example several embodiments of the invention, to which the invention is not limited, the figures illustrating diagrammatic, fractional longitudinal sections through different embodiments. FIGS. 1 and 2 show entrance diaphragms; FIGS. 3 and 4 show exit diaphragms; FIGS. 5 and 6 show central diaphragms; and FIGS. 7 and 8 illustrate the use of auxiliary, ring-shaped lenses.

Referring now to the drawings in detail, FIG. 1 illustrates an entrance diaphragm for a doublet lens $L_1$, $L_2$ carried by a mount F. A vignetting, mechanically nontransparent edge $k$ is embedded in an optical medium in the form of a transparent toroidal member or ring P which is of prismatic cross-section and consists of a material of high refractive power $n_m$, such as flintglass, whereby in the medium proper proportionally to the refractory power $n_m$, every light ray length is shifted with contraction toward the violet spectral region. A metal ring R serves for securing the doublet lens $L_1$, $L_2$ and the prism ring P in position so that they are concentric with the optical axis. The ring P has a front or light entrance surface $f_r$. The back surface coated with metal is denoted $r_e$ and the very exactly polished and refined base surface $p'$. In this manner the definition of the diaphragm diameter $H_{B1}$ is mechanically-geometrically very exactly assured. The inner diameter of the carrying securing ring R stands back by the amount $q'$ so that the ring R is no vignetting diaphragm. $\alpha'$ is the field angle of the lens system, $sc'$ the doublet lens thickness at the optical axis and $s'$ the front focal length. Surfaces $f_r$ and $r_e$ of the toroidal member P form the sides of prism angle $\varphi$, the bisector or symmetry axis of which is disposed at right angles to the base surface $p'$ and likewise to the adjacent side of the field angle $\alpha$. Accordingly, the bisector is also perpendicular to a conical surface formed by rotation of angle $\alpha$ about the optical axis. Thus the surface $p'$ of parallel light incidence is in the minimum of the prismatic deflection.

As in a dispersions prism the highest deflection takes place for the blue spectral range, the diaphragm edge $k$ will be illuminated exclusively with green-blue light, while the yellow-orange-red portion is reflected on the mirror surface $r_e$.

The disadvantage that by the inclined position of surface $p'$, the marginal image zone $H_v$-$H_{Bl}$ becomes masked, can be considerably reduced by imparting a very small ring dimension and by extensively coating the prism ring surface $p'$.

Practical tests of vignetting according to this invention in connection with very well corrected objectives do not show essential reduction of diffraction discs and they show essential improvements of contrast resolving and increases of the resolving limit.

According to a further embodiment of the invention, the principle of the invention can be applied also to a diffraction spectrum (grating spektrum).

As shown in FIG. 2, starting from a concave grating according to Rowland (Baltimore, 1882) (see Grimsehl, Physik, I, 983, 1923), glass elevation P of FIG. 1 is replaced by a toric cylindrical ring. On the peripheral width G—G a flatter, toric cylindrical surface of the radius $\rho$(=$D$=diameter of the cylindrical radius) was polished, metal-coated and a grating parameter 250–500 lines mm.—engraved concentrically relative to the system axis. The adjacent peripheral surface is provided with a concentric slot $sp$, the light incidence surface of which forms a prism-angle $\epsilon$ with the rear surface $r_e$.

It will be understood that the image of the slot $sp$ appears over the metal-coated backside $r_e$ and over the concave reflector GG at the diaphragm edge $k$ again as spectral band ring zone. This zone of grey-blue-violet light is so dimensioned that the edge $k$ is reached and the same results as in FIG. 1 are attained.

Application of the invention to exit pupils is illustrated in FIGURES 3 and 4. Reference symbol $f_h$ in FIG. 3 corresponds to $f_r$ in FIG. 1; $H_h$ in FIG. 3 corresponds to $H_v$ in FIG. 1; $H_h$ in FIG. 4 corresponds to $H_v$ in FIG. 2.

Referring to FIGS. 5 and 6, central diaphragms used in photographic objectives of the type of lamellae are "exit pupils" within the meaning of the present invention. However, as it will be seen from FIGS. 5 and 6 that in the point K, where the two field angles meet, a tilt in the latter must take place in such manner that as a diaphragm for the bordering entrance and exit of the marginal illumination zone only the edge remains active.

The effectiveness of the features according to the invention is increased by a stronger slit illumination. For this reason, above the slit of the slit stop and on the edges of the prismatic ring diaphragms, an illuminating lens having a toric cross-section is cemented in FIGS. 7 and 8. The reference symbols $ra$, L, $ql'$ serve for the mechanical characterizations of the toric ring in FIG. 7; the reference symbols in FIG. 8 are L, $ra$, $spl$. The lens or ring L is in turn illuminated by incoming and/or outgoing light.

In modern refining technique it has been known to vaporize multilayer film foils of different reflective power and dispersion, which do not posses an optically homogeneous condition. By laminating several layers with increasing reflective power, the "light ray" becomes more and more reflected from layer to layer and in the case of parallel incidence relative to the layer, the light ray proceeds stepwise in a curved line. If in the last layer the angle of total reflection is exceeded, the light will be reflected back to the individual layers and it is allowed to reach the vignetting diaphragm edge. Such a laminated elevation or bulge is limited in cross section by plane surfaces and can be easily manufactured, and from its use the above described advantages result.

The foregoing embodiment of the invention is based on the phenomenon that the margin-limiting deformation of spherical light waves has a lower "drop formation effect" at the vignetting edges. If two circles of light rich in contrast mutually approach their edges, upon a certain shortening of the distance a certain narrow connecting path will be formed. According to the theory, this effect is proportionate to the refractive power transition and the refining layers must have very low refractive values.

According to a further feature of the invention, filter dyes may be used in the toroidal member such as the ring P.

As already mentioned above, it is the red range of the spectrum which causes the strongest vignetting. Therefore, only this range or part of the spectrum is supposed to be eliminated when using filter dyes, whereby heat rays are likewise eliminated.

An experimentally established rule for securing optimum results in carrying out the invention in connection with a Rowland grating is as follows:

$$sp = \frac{G \times \lambda}{\sqrt{n_m}} (\pm 10\%)$$

In this equation $sp$ denotes the gap width; G denotes a constant value (2400+focal length of the lens system in mm.); $\lambda$ stands for the wave length of the light in mm.; $n_m$ is the refractive index of the torus material.

According to another feature of the invention, illumination of the vignetting diaphragm rings is brought about in combination with a composite lens system by an artificial additional light source which does not affect the optical image-forming course of rays of said lens system.

According to a further modification of this invention a composite optical system contains several diffraction diaphragms which act as entrance-, middle- and exit- diaphragms and vary in their structure and dimensions.

Finally, the coating of the rear surface of the vignetting ring may consist of an optical-electrical light-cell layer, which may electrically act on the drive of a light-type measuring instrument.

What is claimed is:

1. An insertable diaphragm ring for a lens system having an optical axis, comprising edge means concentrically disposed about said optical axis and positioned adjacent to said lens means so as to form a vignetting diaphragm aperture and delimit an optical path extending along said axis, and a bulging toroidal member of a transparent material concentrically disposed about said optical axis, said toroidal member surrounding and carrying said edge means for illuminating the latter with the green-blue-violet range of the spectrum while removing longer wave lengths from said optical path.

2. In an image-forming optical system, converging lens means having an optical axis, metal-coated edge means concentrically disposed about said optical axis and positioned adjacent to said lens means so as to form a vignetting diaphragm aperture and delimit an optical path extending along said axis, and a bulging toroidal member of a transparent material concentrically disposed about said optical axis, said toroidal member surrounding and carrying said edge means for illuminating the latter with the green-blue-violet range of the spectrum while removing longer wave lengths from said optical path.

3. An optical system as claimed in claim 2, wherein said edge means is embedded in said toroidal member.

4. An optical system as claimed in claim 2, wherein said toroidal member is of prismatic cross-section.

5. An optical system as claimed in claim 4, wherein said transparent material contains filter dyes so as to appear colored in transmitted light, said filter dyes being limited to those which tend toward red in the range beyond the Fraunhofer double sodium line ($D=0.589\mu$) and allow passage of green-blue-violet light.

6. An optical system as claimed in claim 2, wherein said toroidal member is shaped to form a Rowland grating.

7. An optical system as claimed in claim 6, in which Rowland's gap width ($sp$) for the bent grating image is calculated from the empirical equation $$sp = \frac{G \times \lambda}{\sqrt{n_m}} (\pm 10\%)$$

wherein G is a constant (2400+focal length of the lens system in mm.); λ is the wave length of light in mm.; and $n_m$ is the coefficient of refraction of said transparent material of the toroidal member.

8. An optical system as claimed in claim 6, including an annular lens which has a relatively short focal length and is cemented onto said toroidal member for illuminating said grating more intensively.

9. An optical system as claimed in claim 2, wherein said diaphragm aperture serves as an entrance opening; and a central toroidal member and central edge means are arranged and shaped to form an intermediate diaphragm aperture; a terminal toroidal member and terminal edge means being arranged and shaped to form an exit diaphragm aperture.

10. An optical system as claimed in claim 2, wherein said toroidal member has a front face for incidence of light and a rear face coated with metal.

11. An optical system as claimed in claim 2, wherein said toroidal member has a front face for incidence of light and a rear face, and a photoelectric cell is provided in the form of a layer on said rear face of the toroidal member.

References Cited

UNITED STATES PATENTS

| 1,912,377 | 6/1933 | Kosken | 350—204 X |
| 3,180,218 | 4/1965 | Durst | 350—197 X |
| 3,300,268 | 1/1967 | Straub. | |

JOHN K. CORBIN, *Primary Examiner.*

U.S. Cl. X.R.

350—168, 191, 197, 204, 205, 252